Patented Apr. 20, 1943

2,317,137

UNITED STATES PATENT OFFICE 2,317,137

POLYSTYRENE PLASTIC

David A. Fletcher, Bloomfield, N. J., assignor to E. I. du Pont de Nemours & Company, Wilmington, Del., a corporation of Delaware No Drawing. Application September 21, 1939, Serial No. 295,914

6 Claims. (Cl. 260—23)

This invention relates to polystyrene plastics and, more particularly, to such plastics having nacreous effects.

In polystyrene and certain other commercial plastics it has been the established practice to obtain nacreous effects by the incorporation and orientation therein of certain substances insoluble therein and characterized by lamellar form and suitable sheen. Commonly used for this purpose have been the so-called "essence d'orient," obtained from fish-scales, and certain inorganic compounds, particularly mercurous chloride. Similar use has been made of metals and alloys in the form of flakes.

An object of the present invention is to produce nacreous effects in polystyrene plastics and, more particularly, to achieve a pearly sheen which in its brilliance and close approach to true whiteness will constitute an attractive simulation of natural mother-of-pearl. A further object is to accomplish these results at low cost and without impairment of the desirable characteristics of polystyrene as a plastic. Other objects will be apparent from the description of the invention given hereinafter.

The above objects are accomplished according to the present invention by incorporating in a polystyrene plastic a salt of a long-chain aliphatic acid substantially incompatible with the plastic and applying to the plastic an orienting force. It is preferred to use a salt of an alkali or an alkaline earth metal or aluminum with an aliphatic acid having 12–18 carbon atoms, inclusive, and generally in the range of 0.5–10.0 parts per 100 parts of the plastic by weight.

The limits given above are, respectively, that below which the desired visual effect will not be obtained and that above which a further quantity adds little or nothing to the visual effect desired and may introduce undesirable effects such as brittleness and reduction in softening temperature. The exact proportion in specific instances will vary according to individual characteristics of the salt selected and the visual effect desired.

The orientation of the salt in the plastic may be achieved as a result of the flow taking place during the operation of molding the plastic. This can be effected by injection or compression molding. It is to be noted, however, that, even in a compression mold so designed and loaded that flow of the plastic therein is minimized, the article molded exhibits an irregular sheen, presumably as the result of orientation effected during the incorporation of the salt in the plastic which is usually done by kneading, and which orientation seems to persist in the individual granular fragments put into the mold. The application of an orienting force to the plastic at some point after incorporation of the salt is requisite if a nacreous effect according to the present invention is to be obtained.

The salts employed in the present invention are not, in their ordinary commercial form, possessed of a nacreous appearance nor do they appear, even under magnification, to possess the lamellar form heretofore regarded as prerequisite to nacreous appearance in effect materials for this use in plastics. It is, therefore, surprising and not subject to definite explanation that, upon being incorporated in polystyrene, or in plastics of which polystyrene is the predominant ingredient, these salts should, upon the application of an orienting force, impart to the latter a nacreous sheen comparable to that imparted by "essence d'orient."

The following examples, in which all parts are given by weight, illustrate specific embodiments of the invention:

Example I.—A mixture of:

Polystyrene_____ 100
Aluminum palmitate_____ 3 is homogenized by being kneaded on mixing rolls. The temperature of the front roll is about 110° C. and that of the back roll somewhat lower. The homogeneous mixture is drawn off as a thin sheet which is cooled and ground to granular form.

The granular material is molded by compression or injection and yields molded articles of translucent white with a distinct nacreous sheen.

Example II.—A result hardly distinguishable from that of Example I is obtained by the analogous use of calcium stearate instead of aluminum palmitate.

Example III.—Instead of aluminum palmitate, sodium stearate is incorporated with polystyrene as described in Example I.

Example IV.—A mixture of:

Polystyrene_____ 100
Aluminum palmitate_____ 10 is kneaded as in Example I, and the homogeneous mixture reduced to granular form. Articles molded therefrom exhibit nacreous sheen but are more nearly opaque than those of Example I.

Example V.—A mixture of:

Polystyrene_____ 100
Magnesium stearate_____ 1 is kneaded, granulated, and molded as in Example I. The resulting molded articles are cloudy and pearlescent.

*Example VI.*—A mixture of:

| | |
|---|---|
| Polystyrene | 100 |
| Aluminum palmitate | 0.5 | is handled in the manner of Example I, with results similar to those of Example V.

*Example VII.*—A mixture of:

| | |
|---|---|
| Polystyrene | 100 |
| Aluminum palmitate | 5 | is homogenized in a masticator mixer ("Banbury") in the general manner described in U. S. Patent No. 2,056,793 and the resulting dough is cooled and ground. The resulting granular molding compound is molded by compression or injection into articles of nacreous sheen.

*Example VIII.*—The procedure of Example VII is followed with a mixture of:

| | |
|---|---|
| Polystyrene | 100 |
| Aluminum stearate | 5 |

The resulting molded articles are of white color with nacreous sheen.

*Example IX.*—The procedure of Example VII is followed with a mixture of:

| | |
|---|---|
| Polystyrene | 100 |
| Magnesium laurate | 10 |

The resulting molded articles have a nacreous sheen.

*Example X.*—The procedure of Example VII is followed with a mixture of:

| | |
|---|---|
| Polystyrene | 100 |
| Lithium myristate | 5 |

The resulting molded articles have a nacreous sheen.

*Example XI.*—The procedure of Example VII is followed with a mixture of:

| | |
|---|---|
| Polystyrene | 100 |
| Potassium oleate | 3 |

The resulting molded articles have a nacreous sheen.

*Example XII.*—

| | |
|---|---|
| Styrene monomer | 100 |
| Aluminum palmitate | 5 | are stirred together and the styrene polymerized by known method. The polymer, broken down to small granules, is molded by standard technique and yields a molded article having nacreous sheen.

In any of the preceding examples, polystyrene may be replaced by a mixture of polystyrene and plasticizer suitable for molding, such as:

| | |
|---|---|
| Polystyrene | 100 |
| Dibutyl phthalate | 5 | or

| | |
|---|---|
| Polystyrene | 100 |
| Triphenyl phosphate | 3 |

Also, in any of the preceding examples polystyrene may be replaced by an interpolymer in which styrene is the predominating constituent, such as an interpolymer of

| | |
|---|---|
| Styrene | 90 |
| Methyl methacrylate | 10 |

It will be understood that the above examples are merely illustrative and the procedure may be varied considerably within the scope of the present invention.

Polystyrene plastics generally are suitable for use in the present invention. That is, straight polystyrene may be used or interpolymers or mixtures wherein polystyrene predominates; various plasticizers, modifiers, coloring matter, and the like, may be included.

As to the salts employed, they must be incompatible or only slightly compatible with the polystyrene. Any salt of a long-chain aliphatic acid may be used providing it is substantially incompatible with the polystyrene but, preferably, the salts of the alkali and alkaline earth metals and aluminum with aliphatic acids of 12–18 carbon atoms, inclusive, are used. Not only the fully substituted salts may be used but, also, the partially substituted salts, i. e., the mono-substituted salt of a bivalent metal and the mono- and di-substituted salts of aluminum.

The effect of the proportion of salt to polystyrene plastic may be illustrated by considering the use of aluminum palmitate with unplasticized polystyrene. The presence of less than about 1% aluminum palmitate results in little more than the development of a haze in the plastic. As the amount of aluminum palmitate is increased a nacreous sheen develops and about 3% of the salt results in a distinct and attractive nacreous sheen while leaving the plastic still translucent. By the addition of further amounts of the salt, the translucency is gradually diminished and, at about 10%, the plastic is substantially opaque in commercial thicknesses.

Other salts will not give exactly the same visual effect as aluminum palmitate at exactly the same concentrations and, further, the presence of plasticizers or auxiliary components will influence the precise amount of salt to give a desired visual effect. However, in view of the teachings herein, determination of the optimum proportion of salt in the plastic in any specific instance is a matter well within the skill of those versed in the art. The selection of a salt of maximum incompatibility with the plastic with which it is to be used, is favored because it reduces the amount of salt necessary to obtain a desired effect.

The salts will normally be used in a rather high degree of purity so that they may not contribute to the plastic any color or any tendency toward discoloration. With suitably pure salts incorporated in polystyrene plastics of a high grade of purity and corresponding freedom from color, the resulting nacreous plastic is substantially pure white. With such a colorless mixture as a base, the variety of colors in which the plastics may be produced, is limited only by the availability of suitable coloring ingredients. Ordinarily, dyestuffs will be used in preference to pigments since the presence of the latter will, as in other nacreous plastics heretofore known, tend to impair the brilliance of the sheen by impairing the clearness of the plastic in which the sheen producing particles are embedded.

Mold lubricants may be used as required but the salts herein used are of lubricating character themselves and their presence may make unnecessary the use of other substances for lubricating effect.

The incorporation of the salt in the plastic may be effected by kneading the salt and polystyrene plastic or by adding the salt to the styrene monomer, or mixture of monomers in which styrene predominates, prior to polymerizing the monomer.

In any event, an orienting force is requisite to the development of the nacreous sheen. Several methods of applying such a force to produce a flow which causes orientation are well known in the art. In the larger number of instances, this orienting will be effected during the molding of the plastic either by injection or compression molding.

In the preparation of polystyrene plastics as molding compounds, the salt is conveniently incorporated into the plastic by kneading without solvent on hot rolls. A homogeneous distribution of the salt in the mass is readily accomplished.

The kneading process may differ from the known practice of incorporating into plastics the heretofore used sheen-producing materials of lamellar type because it does not require the precautions needed in the incorporation of the latter to avoid the breaking down of their lamellar structure, or their too fine comminution, which results in impairment or loss of their sheen-producing effect. With the salts of the present invention it is feasible to utilize the severe kneading action of a mixer of the "Banbury" type which would have a destructive result on the nacreous effect of the heretofore used lamellar materials.

While the salt may be introduced into the monomeric styrene and then the latter polymerized, special care must be taken to maintain a homogeneous distribution of the salt.

There are a large number of salts adapted for use in the present invention but the following are readily available commercially in sufficiently high purity and, hence, are preferred:

| | |
|---|---|
| Aluminum palmitate | Magnesium stearate |
| Aluminum stearate | Potassium oleate |
| Sodium stearate | Potassium stearate |
| Calcium stearate | |

By "purity" in this connection is meant the absence of objectionable contaminating matter. It is recognized that in making compounds of this type there is seldom a clean separation of the several aliphatic homologs—e. g., that a "palmitate," so-called, is likely to contain a substantial percentage of stearate. Such contamination by homologs is not objectionable.

An advantage of the present invention is that it provides an extremely simple and economical method of obtaining nacreous polystyrene plastics. A particular advantage as compared to the expedient of using lamellar light-reflecting particles for nacreous effects, is that none of the care that was heretofore required to avoid breaking of the lamellar particles, is necessary.

As many apparently widely different embodiments of this invention may be made without departing from the spirit and scope thereof, it is to be understood that the invention is not limited to the specific embodiments thereof except as defined in the appended claims.

I claim:

1. Process of preparing a polystyrene plastic characterized by a nacreous sheen, which comprises forming a plastic mixture essentially consisting of 100 parts of polystyrene and 0.5–10.0 parts of aluminum palmitate and thereafter applying to said mixture an orienting force, said aluminum palmitate being employed in an amount sufficient to give said plastic a nacreous sheen.

2. Process of preparing a polystyrene plastic characterized by a nacreous sheen, which comprises forming a plastic mixture essentially consisting of 100 parts of polystyrene and 0.5–10.0 parts of an aluminum salt of an aliphatic acid of 12–18 carbon atoms, inclusive, and thereafter applying to said mixture an orienting force, said aluminum salt being employed in an amount sufficient to give said plastic a nacreous sheen.

3. A plastic characterized by a nacreous sheen and essentially consisting of 100 parts of polystyrene and 0.5–10.0 parts of an aluminum salt of an aliphatic acid of 12–18 carbon atoms, inclusive, said plastic having been subjected to an orienting force and said aluminum salt being employed in an amount sufficient to give said plastic a nacreous sheen.

4. A plastic characterized by a nacreous sheen and essentially consisting of 100 parts of polystyrene and 0.5–10.0 parts of aluminum palmitate, said plastic having been subjected to an orienting force and said aluminum palmitate being employed in an amount sufficient to give said plastic a nacreous sheen.

5. A molded article characterized by a nacreous sheen and essentially consisting of 100 parts of polystyrene and 0.5–10.0 parts of an aluminum salt of an aliphatic acid of 12–18 carbon atoms, inclusive, said aluminum salt being present in an amount sufficient to give said plastic a nacreous sheen.

6. A molded article characterized by a nacreous sheen and essentially consisting of 100 parts of polystyrene and 0.5–10.0 parts of aluminum palmitate, said aluminum palmitate being employed in an amount sufficient to give said plastic a nacreous sheen.

DAVID A. FLETCHER.